United States Patent [19]

Tran

[11] Patent Number: 5,753,306
[45] Date of Patent: May 19, 1998

[54] METHOD OF FORMING A COMPOSITE COATING WITH PARTICLE MATERIALS THAT ARE READILY DISPERSED IN A SPRAYABLE POLYIMIDE SOLUTION

[75] Inventor: Sang Q. Tran, Yorktown, Va.

[73] Assignee: The United States of America as represented by the Administrator of the National Aeronautics and Space Administration, Washington, D.C.

[21] Appl. No.: 712,529

[22] Filed: Sep. 11, 1996

[51] Int. Cl.⁶ .............. B05D 1/38; B05D 7/24; B05D 5/12; B05D 3/02
[52] U.S. Cl. .............. 427/385.5; 427/379; 427/407.1; 427/420; 427/421
[58] Field of Search .............. 427/379, 407.1, 427/409, 412, 385.5, 380, 420, 421; 528/228, 229

[56] References Cited

U.S. PATENT DOCUMENTS

| | | | |
|---|---|---|---|
| 3,676,383 | 7/1972 | Scala et al. | 524/437 |
| 3,708,458 | 1/1973 | Alberino et al. | 528/222 |
| 3,856,752 | 12/1974 | Bateman et al. | 528/229 |
| 3,870,677 | 3/1975 | Farrissey, Jr. et al. | 528/229 |
| 3,928,673 | 12/1975 | Pardee et al. | 427/409 |
| 4,601,945 | 7/1986 | Pike | 427/370 |
| 4,736,015 | 4/1988 | Rabilloud et al. | 528/228 |
| 5,137,751 | 8/1992 | Burgess et al. | 427/407.1 |
| 5,141,818 | 8/1992 | Lienert et al. | 427/409 |
| 5,166,292 | 11/1992 | Pottiger et al. | 427/372.2 |
| 5,177,176 | 1/1993 | Auman | 528/229 |
| 5,478,916 | 12/1995 | Chang et al. | 528/229 |

*Primary Examiner*—Diana Dudash
*Attorney, Agent, or Firm*—Hillary T. Womack; George F. Helfrich

[57] ABSTRACT

A method for creating a composite form of coating from a sprayable solution of soluble polyimides and particle materials that are uniformly dispersed within the solution is described. The coating is formed by adding a soluble polyimide to a solvent, then stirring particle materials into the solution. The composite solution is sprayed onto a substrate and heated in an oven for a period of time in order to partially remove the solvent. The process may be repeated until the desired thickness or characteristic of the coating is obtained. The polyimide is then heated to at least 495° F. so that it is no longer soluble.

18 Claims, No Drawings

METHOD OF FORMING A COMPOSITE COATING WITH PARTICLE MATERIALS THAT ARE READILY DISPERSED IN A SPRAYABLE POLYIMIDE SOLUTION

CROSS REFERENCE

This application claims the benefit of U.S. provisional patent application Ser. No. 60/003,633, filed Sep. 12, 1995.

ORIGIN OF THE INVENTION

The invention described herein was made by an employee of the United States Government, and may be manufactured and used by or for the Government without payment of any royalties thereon or therefor.

BACKGROUND OF THE INVENTION

1. Field of the Invention

The present invention relates generally to coatings formed from polyimides and particular materials. The present invention relates specifically to a method of forming a composite coating with particle materials that are readily dispersed in a sprayable polyimide solution.

2. Description of the Related Art

There is a need for a sprayable composite coating that combines a polyimide with particle materials. Aromatic, thermoplastic polyimides are a class of polymers used in a variety of high performance/high temperature applications. Such applications include adhesives, matrix resins for composites, and high strength films and coatings.

Combining various types of particle materials with the polyimides creates a composite which can be used in numerous ways. For example, when graphite is combined with the polyimides, an electrically conductive polyimide is formed.

Conductive polyimide films containing carbon particles are well known in the art. For example, Canadian patent 708,896 discloses an electrically conductive polyimide film prepared by blending conductive carbon particles such as carbon blacks in a precursor polyamic acid, shaping the carbon particle containing the polyamic acid into a film, and then thermally converting the polyamic acid into the polyimide film containing the carbon particles.

U.S. Pat. No. 4,568,412 to Atkins et al. discloses a surface conductive shaped article consisting of a polyimide matrix containing carbon black or graphite. Surface conductivity of the article is obtained by exposing the surface of the article to an aqueous or alcoholic etchant solution of an alkali metal hydroxide. The etchant removes a surface layer of polyimide thereby increasing the surface conductivity of the article.

U.S. Pat. Nos. 5,075,036 and 5,078,936, both issued to Parish et al., disclose methods for preparing an electrically conductive polyimide article having a polyimide matrix with carbon black and graphite particles. These methods include the steps of milling carbon black and graphite in a polar solvent to form a slurry, mixing the slurry with polyamic acid to form a dope, shaping the dope and converting the polyamic acid into a polyimide.

The related references use polyimides that are soluble in either high boiling polar protic phenolic solvents or halogenated solvents, many of which are highly toxic and are not used in large scale industrial processes without expensive solvent recovery systems. Thus, these polyimide thermoplastics are solution processed in the polyamic acid state using milder solvents and subsequently cyclodehydrated to form the final polyimide article. However, there is a disadvantage to using the polyamic acid intermediaries in that they are unstable, susceptible to hydrolysis, and generate water during imidization.

The present invention overcomes these disadvantages by dissolving a soluble polyimide in a solvent to form a polyimide binding solution. Particle materials such as graphite are dispersed in the polyimide binding solution. This results in a composite solution which can be sprayed onto a substrate to form a composite coating containing particle materials bonded to the substrate by the polyimide.

An object of the present invention is to provide a method of forming a composite coating with particle materials that are readily dispersed in a sprayable polyimide solution.

Another object of the present invention is to provide an electrically conductive polyimide coating.

Another object of the present invention is to provide an abrasion resistant polyimide coating.

SUMMARY OF THE INVENTION

These and other objects of the present invention are achieved by combining a sprayable polyimide binding solution with particle materials that are easily dispersed within the solution. The composite solution is sprayed onto a substrate and heated in an oven so that the solvent is partially removed. The process is repeated until the desired thickness or characteristics are obtained. The polyimide is then heated to at least 495° F. for at least 30 minutes so that it is no longer soluble.

The soluble polyimide is described in U.S. patent application Ser. No. 08/359,752, filed Dec. 16, 1994. The polyimide is a tough, soluble, aromatic, thermoplastic copolyimide prepared by reacting 4,4'-oxydiphthalic anhydride with 3,4,3',4'-biphenyltetracarboxylic dianhydride and 3,4'-oxydianiline.

The copolyimide of the present invention may be terminated with either a monofunctional anhydride or a monofunctional amine endcapper. The endcapper is added to the copolyimide at an amount ranging from about 2 mole percent to about 10 mole percent. An example of this endcapper is phthalic anhydride.

The 4,4'-oxydiphthalic anhydride and the 3,4,3'4'-biphenyltetracarboxylic dianhydride are added to the 3,4'-oxydianiline at a ratio of 4,4'-oxydiphthalic anhydride to 3,4,3',4'-biphenyltetracarboxylic dianhydride ranging from about 25 mole percent to about 75 mole percent (25:75) to about 75 mole percent to about 25 mole percent (75:25). These copolyimides may be endcapped with either a monofunctional anhydride or a monofunctional amine at an amount ranging from about 2 mole percent to about 10 mole percent. The preferred endcapper is phthalic anhydride.

In particular, the 4,4'-oxydiphthalic anhydride and the 3,4,3'4'biphenyltetracarboxylic dianhydride are added to the 3,4'-oxydianiline at a ratio of 50 mole percent 4,4'-oxydiphthalic anhydride to 50 mole percent 3,4,3',4'-biphenyltetracarboxylic dianhydride. An endcapper such as a monofunctional anhydride or a monofunctional amine may also be added to the copolyimide at an amount ranging from about 2 mole percent to about 10 mole percent. Preferably, the endcapper is phthalic anhydride.

DESCRIPTION OF THE PREFERRED EMBODIMENTS

By the present invention, a copolyimide was prepared by reacting 4,4'-oxydiphthalic anhydride (ODPA) with 3,4,3'4'-biphenyltetracarboxylic dianhydride (BPDA) and 3,4'- oxydianiline (3,4'-ODA). This copolyimide has been found to be a tough thermoplastic material. In addition, the copolyimide may be redissolved in common amide solvents such as DMAc, NMP and DMF after the imide powder has been formed, provided that the polyimide is not exposed to temperatures above its glass transition temperature (Tg). (Typically, once a polyamic acid has been converted to the imide, it cannot be redissolved in common amide solvents.)

The degree of solubility of these copolyimides can be controlled by the processing conditions used to prepare the copolyimide. Several factors were found to affect the solubility of the copolyimide. One of these factors was the mole ratio of ODPA to BPDA. In addition, the percentage of solids and the solvent used to synthesize the copolyimide were also found to have an effect on the solubility. For example, it was observed that when the ratio of ODPA to BPDA was 75 mole percent to 25 mole percent (75/25), and the copolyimide was prepared at 30% solids in NMP, a turbid gel formed when the solution was cooled to room temperature. However, for the same mole ratio, when a 15% solids solution was prepared, the copolyimide remained soluble in NMP when the solution was cooled to room temperature. For a 50/50 mole ratio of ODPA to BPDA copolyimide prepared in NMP, it was found that the copolyimide remained soluble and if allowed to remain undisturbed for 6 to 48 hours (depending on the percent solids) formed a thermally and mechanically reversible gel when the copolyimide was prepared using up to 60% solids. When DMAc was substituted as the solvent, the copolyimide was soluble at 15% solids but precipitated out at 30% solids. As with the 75/25 ODPA/BPDA ratio, copolyimides synthesized at a molar ratio of 25/75 ODPA/BPDA were found to remain soluble in NMP at 30% solids during imidization but when cooled to room temperature formed either a turbid gel or an elastomeric homogeneous gel. At 15% solids in NMP, the copolyimides remained soluble. It was also observed that all of the copolyimides remained soluble in m-cresol. In addition to controlling the mole ratio and percent solids, it was found that controlling the molecular weight of the copolyimide affected the sol-gel behavior.

In order to control the molecular weight of these copolyimides, the stoichiometry may be offset and the copolyimide may be terminated with an endcapper such as a monofunctional anhydride or a monofunctional amine. A preferred endcapper is phthalic anhydride. The endcapper may be added to the copolyimide at an amount ranging from about 2 mole percent to about 10 mole percent depending on the desired properties of the copolyimide. The addition of the endcapper may allow for better processing in some instances.

As a preferred embodiment of the invention, it was found that good results were obtained when the ODPA and the BPDA were added to the 3,4'-ODA at a ratio of ODPA to BPDA ranging from about 25 mole percent to about 75 mole percent (25:75) to about 75 mole percent to about 25 mole percent (75:25). More preferably, the best results were obtained when the ratio of ODPA to BPDA was 50 mole percent to 50 mole percent (50:50). The addition of an endcapper such as a monofunctional amine or a monofunctional anhydride allowed for molecular weight control which provides versatility in the final end-use of the copolyimides.

The polyimide binding solution is formed by combining a soluble polyimide powder with a solvent such as NMP. The resulting solution contains 10% polyimide and 90% solvent. This solution is further diluted by adding 1:1 ratio of solvent by volume. This mixing formula can be customized to either increase or decrease the percentage of polyimide. Other solvents such as tolulene or xylene may be used.

Next, the particle materials are added to the sprayable polyimide binding solution. The solution is then stirred until the particle materials are uniformly dispersed within the sprayable solution.

Examples of particle materials are graphite, piezoelectric ceramics, phosphorous, diamond powder, or any other types of materials that are readily dispersed in the polyimide binding solution.

Using a conventional air spraying apparatus with nitrogen as a gas source, the composite solution is applied onto the surface of a substrate. The substrate is dried in a conventional oven for 30 minutes at a temperature of at least 125° F. so that the solvent is partially evaporated. Elevated temperatures can be used to increase the adhesive properties and strength of the coatings. This process can be repeated to form a multilayer polyimide composite coating.

The additional layers of composite coating are applied until the desired thickness or characteristics are obtained. For instance, multiple layers of one type of particle material can be adhered to the surface by the polyimide. Or, multiple layers of particle materials can be adhered to the substrate, and each layer can be composed of a different particle material, such as graphite for the first layer and phosphorous for the second layer. Finally, different types of particle materials can be dispersed within the solution to form a composite polyimide coating that integrates different types of particle materials.

The polyimide is then heated in a conventional oven for 30 minutes at a temperature of at least 495° F. so that it is no longer soluble. The final drying step can be done under pressure. This results in increased adhesion, smoother and thinner surface coatings, and a reduction in the amount of polymer needed.

EXAMPLE

A composite coating was prepared by combining the soluble polyimide powder with NMP solvent so that a solution containing 10% soluble polyimide, 90% solvent was obtained. 20 ml of this solution was combined with 20 ml of NMP solvent. 5 grams of powdered graphite was added to the 40 ml of solution to form the sprayable composite solution. The entire composite solution was stirred until the graphite was dispersed uniformly throughout the solution.

The solution was sprayed onto a surface of a substrate using a conventional air spraying apparatus with nitrogen as a gas source at 5500 psi. The substrate was dried in a conventional oven at 125° F. for 30 minutes. A second coating of solution was sprayed onto the substrate. The substrate was then heated at 500° F. for 30 minutes until the polyimide was no longer soluble.

I claim:

1. A method of forming a composite coating comprising the steps of:

preparing a soluble polyimide from 4,4'-oxydiphthalic anhydride 3,4,3',4'-biphenyltetracarboxylic dianhydride and 3,4'-oxydianiline;

forming a polyimide binding solution by mixing the soluble polyimide with a solvent;

uniformly dispersing at least one particle material throughout the polyimide binding solution to form a composite solution;

coating at least a portion of a substrate with the composite solution;

heating the substrate to at least 495° F. for at least 30 minutes so that the polyimide is no longer soluble.

2. The method of claim 1 wherein at least one particle material is electrically conductive.

3. The method of claim 1 wherein each particle material is dispersible within the polyimide binding solution.

4. The method of claim 1 wherein at least one particle material is selected from the group comprising graphite, carbon black, phosphorous, and piezoelectric ceramic material.

5. The method of claim 1 wherein the composite solution is coated on the substrate by spraying or sprinkling.

6. The method of claim 1 wherein the heating step is done under pressure.

7. A method of forming a multiple layer composite coating comprising the steps of:

forming a polyimide binding solution by mixing a soluble polyimide with a solvent;

uniformly dispersing at least one particle material throughout the polyimide binding solution to form a composite solution;

coating at least a portion of a substrate with the composite solution;

removing at least a portion of the solvent by heating the coated substrate to at least 125° F.;

repeating the steps of coating and removing a plurality of times;

heating the substrate to at least 495° F. for at least 30 minutes so that the polyimide is no longer soluble; wherein the polyimide is prepared from 4,4'-oxydiphthalic anhydride, 3,4,3',4'-biphenyltetracarboxylic dianhydride and 3,4'-oxydianiline.

8. The method of claim 7 wherein at least one particle material is electrically conductive.

9. The method of claim 7, wherein a plurality of particle materials are uniformly dispersed throughout the polyimide binding solution.

10. The method of claim 7 wherein each particle material is dispersible within the polyimide binding solution.

11. The method of claim 7 wherein at least one particle material is selected from the group comprising graphite, carbon black, phosphorous, and piezoelectric ceramic material.

12. The method of claim 7 wherein the composite solution is coated on the substrate by spraying or sprinkling.

13. A method of forming a multilayer composite coating comprising the steps of:

forming a polyimide binding solution by mixing a soluble polyimide with a solvent;

providing a plurality of different particle materials;

uniformly dispersing each particle material throughout a a separate portion of the polyimide binding solution so that a plurality of composite solutions is formed;

coating at least a portion of a substrate with one of the composite solutions;

removing at least a portion of the solvent by heating the coated substrate to at least 125° F.;

repeating the steps of coating and removing until at least one layer of each of the composite solutions is coated to the substrate;

heating the substrate to at least 495° F. for at least 30 minutes so that 25 the polyimide is no longer soluble.

14. The method of claim 13 wherein at least one particle material is electrically conductive.

15. The method of claim 13 wherein each particle material is dispersible within the polyimide binding solution.

16. The method of claim 13 wherein at least one particle material is selected from the group comprising graphite, carbon black, phosphorous, and piezoelectric ceramic material.

17. The method of claim 13 wherein each composite solution is coated on the substrate by spraying or sprinkling.

18. The method of claim 13 wherein the polyimide is prepared from 4,4'-oxydiphthalic anhydride, 3,4,3',4'-biphenyltetracarboxylic dianhydride and 3,4'-oxydianiline.

* * * * *

UNITED STATES PATENT AND TRADEMARK OFFICE
CERTIFICATE OF CORRECTION

PATENT NO. : 5,753,306
DATED : May 19, 1998
INVENTOR(S) : Sang Q. Tran

It is certified that error appears in the above-identified patent and that said Letters Patent is hereby corrected as shown below:

Claim 13, last line of last process step, contains the numeral 25, which is to be deleted.

Signed and Sealed this

Twentieth Day of June, 2000

Attest:

Q. TODD DICKINSON

Attesting Officer

Director of Patents and Trademarks